United States Patent [19]

Blankenbecler

[11] Patent Number: 5,262,896
[45] Date of Patent: Nov. 16, 1993

[54] REFRACTIVE ELEMENTS WITH GRADED PROPERTIES AND METHODS OF MAKING SAME

[75] Inventor: Richard Blankenbecler, Stanford, Calif.

[73] Assignee: LightPath Technologies, L.P., Tucson, Ariz.

[21] Appl. No.: 827,272

[22] Filed: Jan. 29, 1992

[51] Int. Cl.⁵ .................. G02B 3/00; C03B 19/00
[52] U.S. Cl. .................... 359/653; 359/652; 65/18.1; 65/3.14
[58] Field of Search ............... 359/652, 653; 65/18.1, 65/3.14

[56] References Cited

U.S. PATENT DOCUMENTS

| | | | |
|---|---|---|---|
| 3,846,100 | 11/1974 | Matsumura et al. | 65/3.14 |
| 4,196,963 | 4/1980 | Chen et al. | 65/3.14 |
| 4,528,010 | 7/1985 | Edahiro et al. | 65/18.1 |
| 4,756,733 | 7/1988 | Houde-Walter et al. | 65/3.14 |
| 4,883,522 | 11/1989 | Hageryty et al. | 65/18.4 |
| 4,902,330 | 2/1990 | Sakai et al. | 65/3.14 |
| 4,907,864 | 3/1990 | Hagerty et al. | 359/653 |
| 4,929,065 | 5/1990 | Hagerty et al. | 359/653 |
| 5,032,000 | 7/1991 | Shingaki et al. | 359/652 |
| 5,044,737 | 9/1991 | Blankenbecler | 359/653 |
| 5,069,700 | 12/1991 | Yamane et al. | 65/18.1 |
| 5,171,344 | 12/1992 | Noda | 65/18.1 |

OTHER PUBLICATIONS

Blankenbecler et al, "Gradient Index Glasses of Macro Dimensions and Large Δn", a paper delivered at the International Otto Schott Colloquium of Jul. 23–27, 1990 in Jena, Germany, vol. 129, pp. 109–116 (1991).

Primary Examiner—Bruce Y. Arnold
Assistant Examiner—Evelyn A. Lester
Attorney, Agent, or Firm—Lerner, David, Littenberg, Krumholz & Mentlik

[57] ABSTRACT

Methods of making gradient property refractive elements such as gradient index lens blanks. The spatial distributions of constituents achieved by subjecting various starting assemblages to various diffusion conditions are predicted. Each such predicted spatial distribution of constituents is converted to a spatial distribution of the graded property. The property distribution which best approximates a desired distribution is selected, to thereby select one starting assemblage and one set of diffusion conditions. That assemblage and set of conditions are used in fabrication of the element.

25 Claims, 5 Drawing Sheets

REFRACTIVE ELEMENTS WITH GRADED PROPERTIES AND METHODS OF MAKING SAME

FIELD OF THE INVENTION

The present invention relates to optical refracting elements and methods of making the same.

BACKGROUND OF THE INVENTION

Common optical elements such as lenses and prisms are formed from homogeneous masses of transparent materials. Thus, the properties of the material are homogeneous throughout the entire optical element. Although several optical elements formed from different materials can be cemented or otherwise assembled together to form a compound element, the properties of the material within each element of the compound device are still constant. Optical theorists have realized that the performance of optical systems could be materially enhanced if refractive elements could be made with optical properties such as index of refraction and other properties which vary in a preselected fashion from place to place within the optical element. Optical elements having an index of refraction which varies from place to place within the element are referred to as "gradient index" elements and, more generally, optical elements having any property which varies from place to place with the element are referred to as "gradient property" elements.

Various attempts have been made heretofore to manufacture gradient property elements, and particularly gradient index elements. Certain small gradient index elements can be fabricated by exposing a uniform material to a leaching process in which one or more constituents are gradually removed by diffusion from the element into a leaching solution. The reverse approach of exposing the element to a bath or vapor containing an additive so that the additive diffuses into the element can also be used. These surface-based modification techniques require lengthy treatment at elevated temperatures and under controlled conditions to produce even a small gradient in a property over a small region of the optical element adjacent its surface. Accordingly, these techniques have been largely limited to fabrication of very small optical elements such as optical fibers with very small gradients in index of refraction or other properties.

U.S. Pat. Nos. 4,907,864; 4,883,522; and 4,929,065 of Hagerty et al and my own earlier U.S. Pat. No. 5,044,737 disclose fundamental advances in manufacture of gradient property optical elements including gradient index elements. The disclosures of these patents are hereby incorporated by reference herein. These patents disclose manufacture of optical elements by assembling starting materials of non-uniform composition to form a starting assemblage having different compositions at different locations in the assemblage. For example, glass plates of different compositions may be stacked one atop the other to form the starting assemblage. In an analogous manner, the starting assemblage may include a mass incorporating glass frits or powders of various compositions arranged so that the different compositions are located at different points. That starting assemblage is then subjected to a diffusion process, typically at elevated temperature, so as to fuse the various starting materials into a solid mass, commonly referred to as a "blank" which can either be used directly as an optical element, or, more preferably, ground to a desired shape or otherwise treated to fashion it into a finished optical element. During the diffusion process, each constituent tends to diffuse from regions of the assemblage where it is at a high concentration to where regions where it is at a lower concentration. Thus, after the diffusion process has operated for a finite time, the resulting blank has a smooth gradation in composition and hence has optical properties which vary smoothly from point to point within the blank. Because the processes taught by these patents do not depend upon diffusion to or from the surface of the blank, they can be used to form blanks, and hence optical elements, of essentially unlimited size and with substantial gradients in optical properties. The processes taught in these patents accordingly represent major advances in the art of fabricating gradient property optical elements, and provide gradient property optical elements which were not previously available.

Despite these major advances in the art, there have been needs for still further improvements. The distribution of optical properties resulting from the assemblage-diffusion process of these patents, if conducted under controlled conditions, will be the same on each repetition using an identical starting assemblage having an identical distribution of constituents. For example, if a series of plates having different compositions are stacked atop one another, and subjected to the same diffusion conditions, the resulting body will have a particular distribution of index of refraction. If identical plates are used in another repetition under identical diffusion conditions, the resulting body will have the same distribution of index of refraction. The process accordingly is repeatable. However, there is no simple relationship between the starting distribution of constituents and the final distribution or pattern of variation of optical properties throughout the resulting product. Thus, the correct pattern has been selected by "cut and try" methods. These methods are laborious and hence expensive. Where only a few pieces are to be produced, the expense of experiments required to find the correct starting distribution of constituents in the assemblage can exceed the cost of actually making the pieces after finding the right distribution.

Where many pieces are to be produced, the initial expense of finding the correct distribution of constituents for the assemblage can be spread over a greater number of pieces and hence becomes less significant. However, a different problem arises in mass production. The starting materials supplied to the process may vary slightly. For example, where glass plates are used to make the assemblage, the composition of one or more of the plates may vary from batch to batch. Such variations require experimentation to find appropriate corrections, such as changes in thickness of the various plates or changes in the diffusion time, to be used in the process so as to correct for the effects of the difference in composition.

Accordingly, there have been needs for improvements in the assemblage-diffusion process as taught in the aforementioned patents which would facilitate selection of the appropriate distribution of compositions in the starting assemblage. As stated in the paper "Gradient Index Glasses of Macro Dimensions and Large Delta n", of Blankenbecler et al, delivered at the International Otto Schott Colloquium of Jul. 23 to Jul. 27, 1990 in Jena, Germany, and later published J. Noncrystalline Solids, Vol. 129, L. 1-3, pp. 109-116 (1991), "The design problem now is to find an achievable initial index distribution n (Z,0) that will yield the desired index profile n(Z,t) (to the accuracy required) after fusing for a time t." Although that paper describes certain relationships for mathematical treatment of the diffusion problem and also mentions the "Lorentz-Lorenz", relation between index of refraction and "density" or concentration of various atoms, it does not disclose an overall method of solving the "design problem."

SUMMARY OF THE INVENTION

One aspect of the present invention provides improved methods of making gradient property optical elements, i.e., a method of making refractive elements having a preselected spatial distribution of at least one property. Methods according to this aspect of the invention preferably include the step of calculating a predicted concentration to profile relationship relating the spatial distribution of concentration of at least one constituent to the diffusion time-temperature profile. The term "diffusion time-temperature profile" refers to a set of conditions defining one or more temperatures and the diffusion time at each such temperature. Such predicted concentration-to-profile relationships are calculated for each of a plurality of different starting spatial distributions of concentration, each such starting spatial distribution describing the distribution of one or more constituents within a starting assemblage. For example, a starting spatial distribution may be as an array of plates of different compositions. For each starting spatial distribution of concentration, the step of calculating the concentration-to-profile relationship typically involves solution of a differential equation of diffusion in which the starting spatial distribution of concentration is treated as an initial or boundary condition, and in which this equation is solved to obtain the distribution of concentration for each of several different time-temperature profiles. These time-temperature profiles may include different diffusion temperature, different diffusion times, or both. Preferably, however, the diffusion temperature is fixed and the different diffusion time-temperature profiles are simply different diffusion times at such fixed, preselected diffusion temperature. The concentration-to-profile relationship for each starting distribution of concentration obtained in this step explicitly or implicitly includes a description of the distribution of concentration throughout the assemblage for each of several diffusion profiles.

The method preferably further includes the step of converting each such distribution of concentration for each profile into a distribution of said property or properties. This step preferably is performed by applying a concentration to property relationship relating concentration of the various constituents to each of the properties. For example, where the property to be controlled is index of refraction, the concentration to property relationship may be a relationship between concentration of one or more constituents and index of refraction. This step thus provides a description of the spatial distribution within the assemblage of each of the properties to be controlled for each diffusion time-temperature profile included in the concentration to time relationship. For example, where index of refraction is a property to be controlled, this step will provide a description of the spatial distribution of index of refraction throughout the assemblage which would be achieved by subjecting the assemblage to the set of diffusion times and temperatures specified by the particular profile and then stopping the diffusion process. Thus, for each different starting spatial distribution of concentration, a spatial distribution or map of the property versus position within the assemblage is derived for each of many different diffusion profiles. Each such spatial distribution or map of the property is associated with one diffusion profile and with one starting spatial distribution of concentration.

The method further includes the step of selecting from among the various spatial distributions or maps of the property or properties the particular spatial distribution or map which most closely approximates the preselected spatial distribution of the property or properties to be achieved. The selection may be based on one or more criteria for closeness of fit. Such criteria may include the sum of the squares of the deviations between the preselected property distribution and the spatial distribution being tested for closeness of fit, the maximum deviation in one or more properties, or other criteria. As each such spatial property distribution or map is associated with a particular diffusion profile and with a particular starting spatial distribution of concentration, this step results in selection of the particular diffusion profile and the particular starting spatial distribution of concentration associated with this best property spatial distribution. The selected starting spatial distribution is the optimum starting spatial distribution of all of those used in the computations, whereas the selected diffusion profile is also an optimum.

The method further includes the step of providing an assemblage of starting materials corresponding to the selected starting spatial distribution of concentration and the further step of subjecting the assemblage to diffusion for conditions replicating the times and temperatures specified by the selected diffusion profile.

Preferred methods in accordance with this aspect of the invention permit selection of the starting assemblage directly, without the cut and try work previously required. This results in a cost savings.

Each of the starting spatial distributions of concentration used in the method may correspond to a distribution of concentrations which can be achieved by juxtaposing starting materials selected from a particular set of available starting compositions. In this case, the step of providing the assemblage for diffusion includes the step of forming such assemblage from that set of starting materials. The method may further include the step of monitoring the actual compositions of the starting materials and performing the predictive steps which lead to selection of the optimum starting spatial distribution of concentration using the actual compositions of the available starting materials as the compositions of the available starting materials. Stated another way, the predictive steps are based upon data taken from the actual, available materials rather than from nominal compositions. For example, in methods where plates are stacked atop one another, the actual compositions of the glass slabs available to make the plates are used in making up the starting spatial distributions. Thus, each such starting spatial distribution would correspond to a stack of plates, each having an actual composition corresponding to the composition of one of the actual available slabs in the set of available plates.

In serial production, the steps of making the assemblage and subjecting the assemblage to diffusion, are repeated numerous times. Different actual compositions may be used in some of these repetitions as, for example, where the actual compositions of plates change from batch to batch. The predictive steps used to select the optimum starting composition and diffusion time preferably are repeated whenever the available compositions change so that on each repetition of the assemblage forming and diffusion steps, the starting spatial distribution of concentrations and diffusion profile are those selected based upon actual compositions of starting materials used in that repetition. Stated another way, when the batch compositions changes, the starting spatial distribution of concentration may also change. This permits efficient serial production without stopping the production line for experiments when the raw materials change.

A further aspect of the invention provides methods of making optical systems. A method according to this aspect of the invention preferably includes the step of determining a design for the optical system which includes a desired spatial distribution of at least one optical property within a gradient-property refractive element. This design typically also includes other parameters of the gradient-property element, as well as parameters of other elements in the system. These other parameters may include conventional parameters such as surface curvatures. This design is selected so that the optical effects of all elements in the system cooperatively yield a desired optical performance. In a further step of the method, a set of available starting spatial distributions of concentration of at least one constituent is selected. For example, the set of available starting spatial distributions may include the set of spatial distributions of concentration which can be achieved by stacking plates selected from a set of available materials. For each such starting spatial distribution in that set, concentration distributions for various diffusion profiles are calculated and converted into predicted property distributions for each diffusion profile in substantially the same way as discussed above. Once again, for each starting spatial distribution of concentration there is a predicted property distribution for each of several diffusion profiles. Each such property distribution defines the pattern of the optical property or properties throughout space within the element which would be achieved diffusion under the time and temperature conditions specified by one profile for one starting spatial distribution.

The method desirably includes the further step of selecting from among these spatial distributions, the particular spatial distribution which most closely approximates the desired spatial distribution of the optical property or properties. Once again, because each such spatial distribution is associated with a particular diffusion profile for a particular starting spatial distribution of concentration, selection of the particular spatial distribution of the optical property results implicitly in selection of the associated starting spatial distribution of concentration and also in selection of the diffusion profile. The selected spatial distribution of the optical property or properties is the best spatial distribution of such property or properties achievable with the set of available starting spatial distributions of concentration.

The process most desirably further includes the step of determining whether the best-achievable spatial distribution of the optical property or properties matches the desired spatial distribution of such property or properties to a predetermined standard of acceptability. The step may include determination of the optical performance which would be provided by the optical system with the gradient-property refractive element incorporating this best achievable spatial distribution. If the best achievable spatial distribution of the optical property or properties does not match the desired spatial distribution to within such standard of acceptability, then the foregoing steps are repeated using a different design incorporating a different desired spatial distribution of the optical property or properties within the first refractive element. This procedure is repeated until a match is found. Once a match is found, the gradient-property refractive element is formed by providing an assemblage of starting constituents which corresponds to the particular starting spatial distribution of density which provided the matching distribution of optical properties and then subjecting that assemblage to diffusion using times and temperatures replicating those specified by the diffusion profile which provided the match. The gradient-property refractive element typically is subjected to finishing steps and assembled with the other elements of the system.

Methods according to this aspect of the invention incorporate the realization that, with the ability to predict the spatial distribution of the optical property, one can select an overall optical design for the system which involves a realistic graded property element, i.e., one which can be made using an available starting distribution of concentrations. A method according to this aspect of the invention avoids the situation which can be encountered in cut and try work, where the optical designer designs the entire system only to find that the specified gradientproperty element cannot be made.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
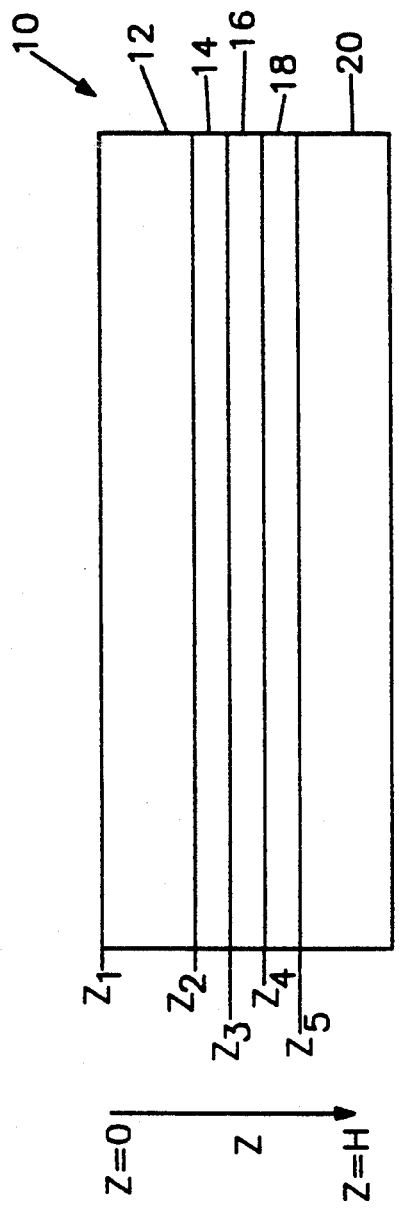
FIG. 1 is a diagrammatic view depicting an assemblage utilized in one embodiment of the invention.
Figure 2:
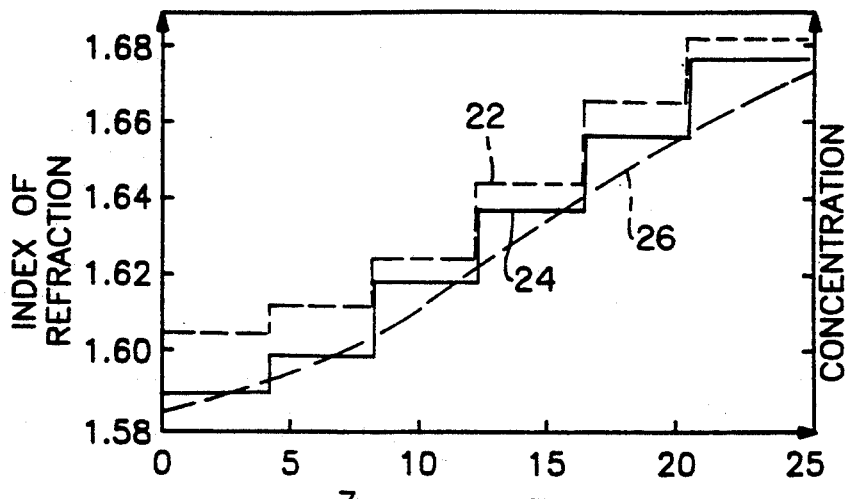
FIG. 2 is a graph depicting a concentration profile and an index of refraction profile of the assemblage illustrated in FIG. 1.
Figure 3:
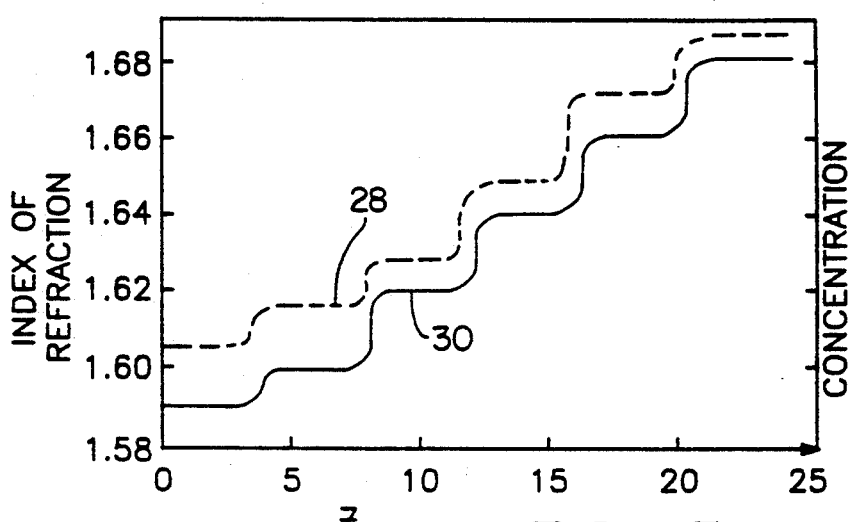
FIG. 3 is a graph similar to FIG. 2 but depicting the concentration and index of refraction at a later time during the process.

A process for making an optical element in accordance with one embodiment of the invention utilizes starting assemblages 10 as illustrated in FIG. 1. Each such assemblage 10 includes a series of plates 12, 14, 16, 18 and 20 stacked one atop the other. The plates have different compositions. The downward vertical or depth direction is indicated by the arrow Z in FIG. 1. The plates are initially of different compositions. The concentration of one constituent common to all of the plates is illustrated by the broken line 22 in FIG. 2. Also, all of the plates have different indices of refraction as indicated by the solid line 24 in FIG. 2. Of course, in the starting assemblage, there are discrete, well defined boundaries between adjacent plates and hence both the concentration and index graphs are in the form of multiple step functions. There are similar stepwise distribution curves for the other constituents and other properties. The particular arrangement illustrated has progressively increasing concentration of the particular ingredient shown in the graph, and progressively increasing index of refraction towards the bottom of the stack, but this is purely an arbitrary selection. When a starting assemblage as illustrated in FIG. 1 is subjected to diffusion, as by holding the assemblage at an elevated temperature, the plates 12–20 fuse with one another to form a unitary blank, and constituents diffuse from plate to plate, i.e., within those regions of the unitary blank corresponding to the original plates. Thus, the concentration of the various constituents in each region change progressively. After relatively short diffusion time at a particular temperature, the concentration profile through the assemblage or blank has the appearance illustrated by dash line curve 28 in FIG. 3. That is, the particular constituent has started to diffuse through the regions corresponding to the original boundaries between the plates, so that the initial step functions have changed to somewhat smoother functions. Nonetheless, the initial step-function characteristic of the concentration distribution is still quite apparent in the concentration distribution 28 at this time. Although the concentration of only one constituent is depicted in the drawings, it should be appreciated that the concentrations of other constituents will likewise change from step-functions in the initial starting assemblage to smoother functions as diffusion progresses. Because the index of refraction is a function of the concentrations of the ingredients in the glass, the index of refraction also changes progressively. Thus, at the time illustrated in FIG. 3, the original step-wise variation in index of refraction with depth of Z-direction distance in the starting assemblage has changed to the somewhat modified profile illustrated in FIG. 3.

Figure 4:
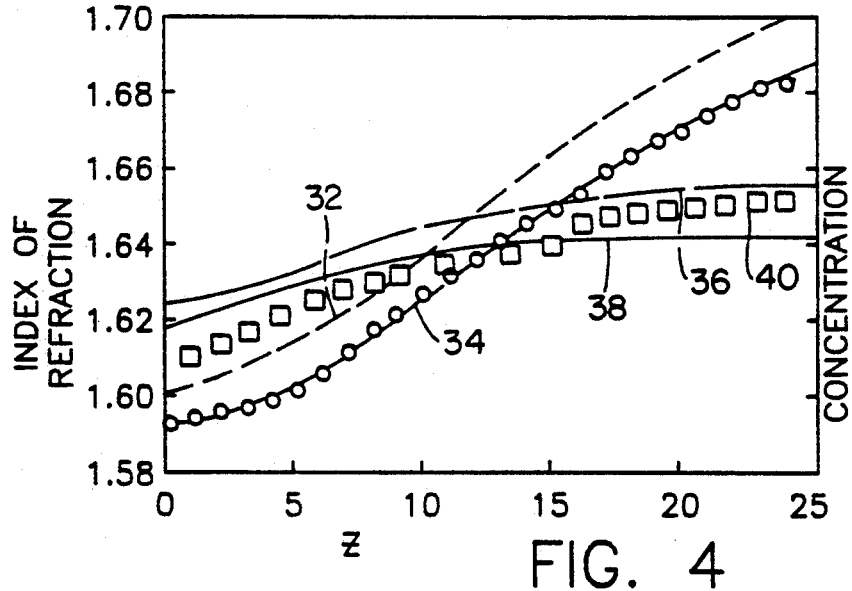
FIG. 4 is a graph similar to FIGS. 1 and 2 but depicting the concentration and index of refraction profiles at a still later time.

At a still later stage, after a longer time at the same temperature, the profile of concentration versus step changes to the smooth curve 32 (FIG. 4) whereas the profile of index of refraction versus depth of Z-direction distance in the assemblage changes to the smooth curve 34. At at even later stage, the profile of concentration versus depth has changed to the smoother, less sloped profile 36 depicted in FIG. 4, so that the index of refraction profile is also smoother and less sloped as indicated at 38. Of course, with infinite diffusion time the concentration profiles for all constituents would be, completely flat, straight lines indicating uniform concentrations of all constituents throughout the blank, and hence the index of refraction throughout the blank would be uniform as well.

Provided that the diffusion is conducted under appropriately controlled conditions at a given temperature, as further discussed below, any given starting assemblage will always yield the same series of concentration versus depth profiles at the same series of times. Stated another way, for different starting assemblages the curves of FIGS. 2, 3 and 4 would be different. To make an optical element having a selected index of refraction distribution, using this single diffusion temperature, one must select a starting assemblage for which at least one of the index of refraction curves achieved at some diffusion time will match desired index of refraction distribution within the desired tolerance. This assemblage in turn must be subjected to diffusion for the particular diffusion time required to produce that matching index of refraction distribution, and the diffusion process must be stopped at that time.

Figure 5:
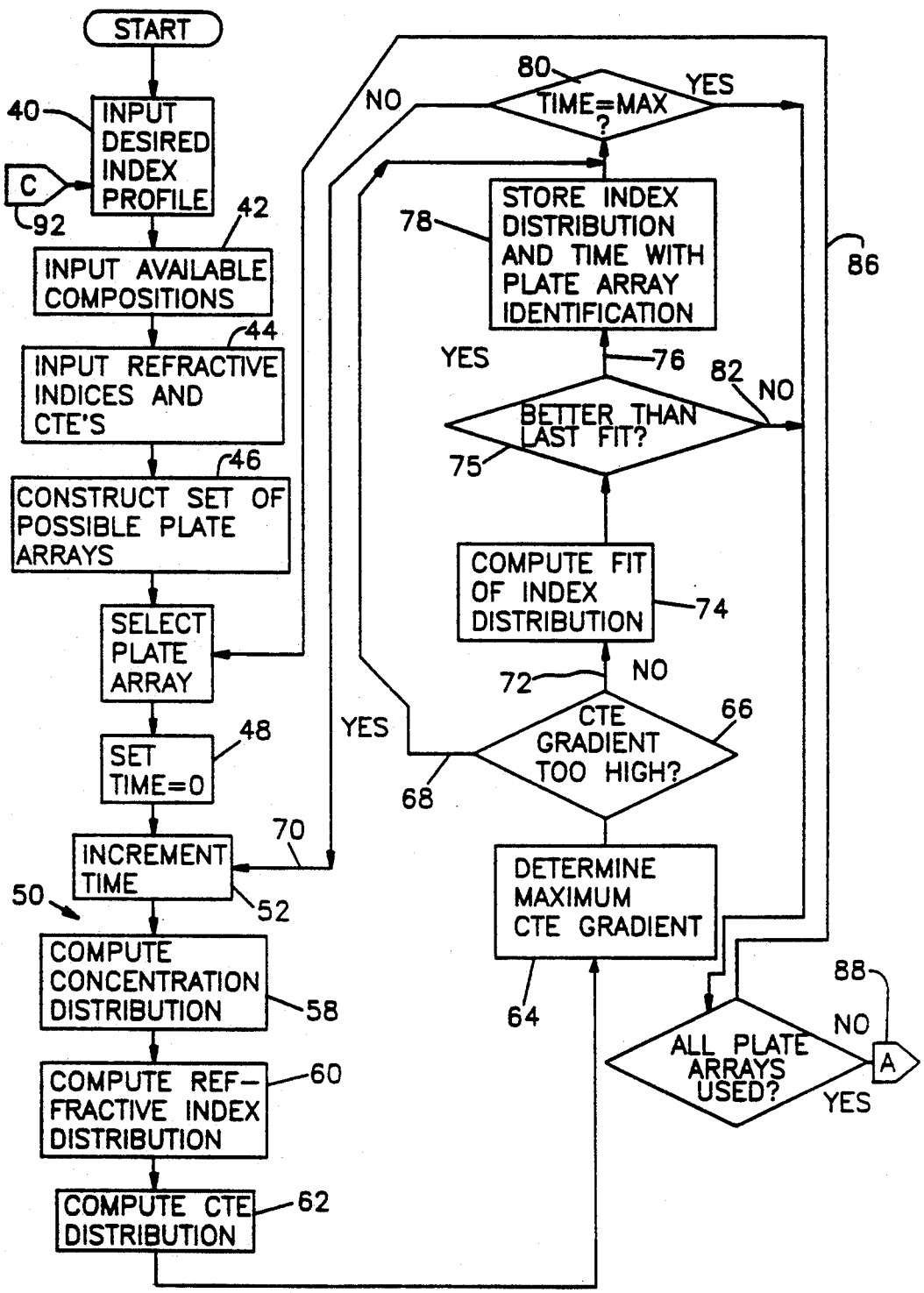
FIGS. 5, 6 and 7 are schematic flow diagrams depicting a computer program.
Figure 6:
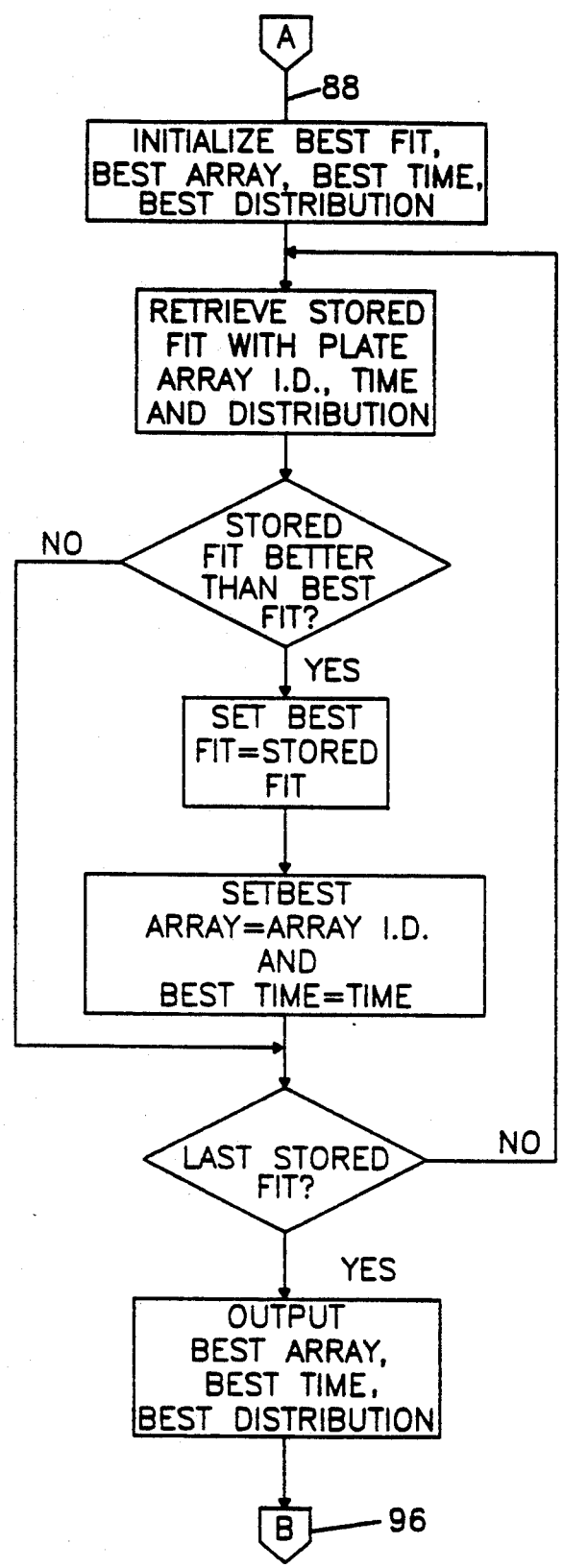

In accordance with one embodiment of the invention, a computer program as illustrated in FIGS. 5 and 6 is employed to select the appropriate starting assemblage and diffusion time. In step 40 of the program, the desired profile for the index of refraction is input into to the computer. In the case illustrated, the index of refraction is to vary in only one dimension, i.e., in only the Z-direction of the assemblage. Accordingly, the desired index of refraction profile can be input as a series of Z-values with associated index of refraction values. The compositions of the particular set of materials available for use in the process are also input to the computer in step 42. Where any of many different compositions can be prepared to order, the available compositions may represent nominal values for all of the compositions which can be ordered. Most preferably however, the available compositions input to the computer represent the actual concentrations of constituents in particular batches of materials which have already been made and which are available for use in the fabrication process. Most preferably, where materials are supplied in batches, the composition of each batch is actually measured and the compositions of batches actually onhand are used as the available compositions for input to the computer. The compositions can be measured by any known analytic techniques. Ordinarily, however, full chemical analysis is unnecessary. Provided that the nominal composition of the material is known, it is only necessary to determine to what extent, if any, the material differs from the nominal composition. Provided that the material is close to a nominal composition, measurements of one or more properties of the material can be used to determine its composition to the required degree of accuracy without actual chemical analysis. For example, where the materials are all optical glasses formed from a few major constituents, and where the actual glasses have indices of refraction and densities within a few percent of their nominal values, the actual compositions (the actual proportions of the major ingredients in the actual glasses) can be determined accurately by measuring the index of refraction and density of the actual glasses and comparing these with corresponding values for other known glasses in the same family of glasses. The relationships discussed below between properties and compositions can also be applied.

Properties such as values of the diffusion constant for each constituent at the diffusion temperature to be employed, the refractive index, coefficient of thermal expansion and density of each available composition are also input to the computer.

In the next stage 46 of the process, the computer prepares a set of starting spatial distributions of the constituents. Each such starting spatial distribution represents a spatial distribution which can actually be made from the available compositions in the physical system used in the fabrication process. In the process illustrated in FIGS. 1–4, each starting spatial distribution must be a set of plates, each such plate being a slab of uniform thickness formed entirely from a single one of the available compositions. Where the available compositions are provided as pre-formed raw slabs which can be ground to any thickness less than the thickness of the raw slab, each plate formed from a given composition must have a thickness less than the thickness of the corresponding raw slab. Also, the system typically is set to use plate thicknesses which are integral multiples of a preselected plate thicknesses incurrent. For example, the system may be set to consider only plate thickness which are integral multiples of 0.1 mm or some other convenient interval. Additionally, there is a minimum plate thickness corresponding to the minimum thickness of a plate which can be ground using the available grinding techniques. With typical optical glasses and ordinary grinding techniques, this minimum plate thickness is about 0.1 mm for a plate of 25 mm radius. Thus, the possible starting spatial distributions correspond to a finite but nonetheless large number of possible plate arrays which can be physically made using the available compositions.

This set can be further limited to exclude those plate arrays which cannot possibly result in a distribution of index of refraction matching the desired index of refraction profile. For example, where the desired index of refraction profile in the finished optical element has a gradually increasing slope in the plus-Z direction, those starting spatial distributions representing plate arrays having higher-index materials at the top (low-Z) position and low-index materials at the bottom (high-Z) can be excluded inasmuch as diffusion can never reverse the direction of the difference between the top and bottom of the array. Similar rules of exclusion can be applied with other desired index distributions. For example, where the desired final index distribution has the highest index in the center (at the middle of the Z-axis) and lower indices at opposite ends of the Z-axis, the computer may exclude those starting distributions which have the lowest-index composition adjacent the middle of the Z-axis. Also, it is generally undesirable to place a high-density (high specific gravity) material above a low-density material in the stack. Such placement tends to make the assemblage more susceptible to convection during the diffusion process. Accordingly, a further rule of exclusion may operate to exclude any starting distribution having a high-density material above a low-density material.

Alternatively, or additionally, the set of possible starting distributions can be restricted to only those which meet a rule of inclusion. For example, it is desirable to have the stepwise pattern of index of refraction constituting a starting spatial distribution of index reasonably close to the desired final distribution of index. Thus, a rule of inclusion may operate by comparing the index of refraction of each plate in a particular starting spatial distribution with the desired index of refraction at the point on the Z-axis corresponding to the midpoint of the plate. If the difference between these two is less than a specified amount, for all plates in the distribution, then the starting spatial distribution is reasonably close to the desired final distribution and the starting spatial distribution or plate array is included in the set of possible plate arrays. Selection of the possible plate arrays can also be assisted manually.

Once the set of plate arrays to be considered has been selected, the plate arrays are selected in sequence. For each selected plate array, a computer first initializes diffusion time to zero. At this point, the computer enters a repetitive logic loop 50, using the same starting distribution of concentrations of each pass through the loop. On each pass, the computer increments the diffusion time and hence selects a new diffusion time at step 52. The concentration distribution is calculated from the initial boundary condition set by the plate array or starting spatial distribution. This boundary condition is applied in solution of the general equation of diffusion $$\frac{d}{dz}\left[ D_i(z) \frac{d}{dz} c^i(z,t) \right] = \frac{d}{dt} c^i(z,t)$$

in which
Z is distance along the Z-axis;
t is time;
$c^i$ is the concentration of the $i^{th}$ constituent; and $D_i$ is the diffusion coefficient for the $i^{th}$ constituent. This diffusion coefficient is expressed as $D_i(Z)$ to denote that the diffusion coefficient itself may be a function of Z. That is, the diffusivity of a particular constituent through a region of one composition may be different from the diffusivity of the same constituent through a region of another composition. For example, the diffusivity of a particular constituent plate 14 may be different from that of the same constituent plate 16 in FIG. 1. Accordingly, different diffusion constant $D_i$ are used for computations over different ranges of Z. Where $Z=Z_1$ to $Z_2$, the various diffusion constant $D_i$ are taken as equal to the diffusion constant for the constituent in question in a plate having the composition of plate 12; for the region $Z=Z_2$ to $Z_3$, the diffusion constants $D_i(z)$ are taken as equal to the diffusion constant of the various constituents in a plate having the composition of plate 14 and so on. Typically, the degree of variance in the diffusion constants with changes in composition over small ranges is also small, so that the diffusion constants need not be determined with great precision. For typical families of materials containing various proportions of the same constituents, the diffusion constant of any given constituent can be measured on a few materials having the constituents present in various proportions, and this data can be used with a standard linear interpolation algorithm to derive the diffusion constant for the given constituent in other materials of the same family incorporating the same constituents in other proportions. Although the diffusion constants typically do not vary exactly linearly, the degree of error in the diffusion constant arising from linear interpolation over the ranges encountered in practice normally is not of concern. Also, although the diffusion constants within each region of the assemblage would be expected to change with time as the composition of that region itself changes, changes in the diffusion constant with time ordinarily are so slight that the same can be disregarded without materially adversely affecting the prediction achieved.

Methods of solving the diffusion equation per se are well-known and any such method may be utilized in present invention. For example, finite element, lattice or relaxation methods may be employed. These are standard methods for integrating differential equations that are available in many commercial software packages of numerical methods. Preferably however, the diffusion equation is solved by use of a so-called Green's functions. Thus:

$$c^i(z,t) = \sum_{q=1}^{q=P} c_q^i \int_{q\text{th plate}} dz' G_i(z',z;t)$$

where:
$c_q^i$ is the starting concentration of the $i^{th}$ constituent in the $q^{th}$ plate;

P is the total number of plates in the system; $Z'$ is a dummy variable and $G_i(Z',Z,t)$ is a function such that $$G_i(z',z;t) = g([z' - z];b) + g([z' + z];b) + \sum_{k=1}^{k=\infty} G_b(k)$$

where: the function g is defined such that $$g(\alpha;\beta) = \frac{1}{\sqrt{\pi\beta}} \exp\left(\frac{-\alpha^2}{\beta}\right)$$

and the function $G_b(k)$ is defined as:

$$G_b(k) = g([z'-z-2kH];b) + g([z'-z+2kH];b) + g([z'+2kH];b) + g([z'+z+2kH];b)$$

where $$b = 4D_i t$$

and H equals the maximum value of Z in the assemblage.

In calculation of this function, each $D_i$ is assumed to be constant over Z. The Green's function satisfies the boundary condition that diffusion out of the top ($Z=0$) or bottom ($Z=H$) of the stack is forbidden.

For any value of t, these expressions yield values for the concentration $c^i$ of each constituent. Typically, in computing the values for equation 3 above, the summation over k can be truncated at a small value typically $K=2-4$) without materially affecting the result, as the terms for higher values of k become vanishingly small. Thus, whether by numerical methods or by use of the aforementioned Green's functions, the computer derives a concentration profile for each constituent. That is, for any given value of t, the computer derives a set of values representing the function $c^i(z)$ for various values of z. The concentration values for each particular value of time t represent these concentrations at all of the points in the assemblage, i.e., at all values of z from $z=0$ to $z=H$. These concentration values of course represent the concentrations of the various constituents which would be present in the assemblage at any point z if the diffusion process were stopped at the particular time. Stated another way, these values provide a complete map of the concentrations which would be present in a sample made from a starting assemblage corresponding to the particular plate array used with diffusion stopped after the particular time selected.

The predicted concentrations are converted to predicted properties using a concentration to property relationship relating each property to the concentrations of the various constituents. In the case illustrated, the two properties to be predicted are index of refraction and coefficient of thermal expansion or "CTE". Most preferably, each such concentration to property relationship is in the form $$f(n(z)) = f(n_0) + \sum_i (c^i(z) - c_o^i) F_i$$

where: f is a function;
$F_i$ is a coefficient associated with the $i^{th}$ constituent;
$n(z)$ is a property n at location z;
$n_o$ is the property n of a reference material; $c^i(z)$ is the concentration of the $i^{th}$ constituent at location z and $c^i_o$ is the concentration of the $i^{th}$ constituent in the reference material. Stated another way, the concentration to property relationships preferably include a linear or first-order function of concentration of each constituent. The coefficient $F_i$ for each constituent in a sense represents the importance or contribution of the particular $i^{th}$ constituent in the property question. Most preferably, within the region of the assemblage corresponding to a particular plate of the starting assemblage, that plate, or an adjacent plate is considered as the referenced material. Stated another way, the linear function is used to predict the degree to which the property at any point z within a particular plate changes from the original, starting property of that particular plate. For example, with the starting assemblage 10 illustrated in FIG. 1, for any point from $Z=Z_2$ to $Z=Z_3$, $n_o$ would be taken as the particular property n of plate 14, whereas each $c^i_o$ would be taken as the concentration $c^i$ of the $i^{th}$ constituent in plate 14. For the region $Z=Z_3$ to $Z=Z_4$ the corresponding parameters of plate 16 would be used and so on. In the case of refractive index, the function f may be the Lorentz-Lorenz formula wherein:

$$f(n) = \frac{3(n^2 - 1)}{(n^2 + 2)}$$

That is, where n represents the refractive index, the so-called Lorentz-Lorenz law of refractive index states that:

$$\frac{3(n^2 - 1)}{(n^2 + 2)} = \sum_i c^i(z) P_i$$

in which $P_i$ is the electric polarizability of the $i^{th}$ constituent. Stated another way, where n represents the refractive index and the Lorentz-Lorenz formula given above is used as the function of refractive index, each coefficient $F_i$ in the linear expression represents the electric polarizability $P_i$ associated with one constituent.

While the polarizabilities $P_i$ were assumed constant in the original derivation of the Lorentz-Lorenz law, in nature they are dependent on the concentrations That is, $P_i$ for any given $i^{th}$ constituent will vary with the concentrations of that constituent and with the concentrations of other, surrounding constituents. Most preferably however, the effects of such variations are minimized by using values of the constants appropriate to the ranges of concentrations encompassed by the assemblage. That is, the coefficients determining the degree to which the property varies upon variation of the various ingredients can be derived from tests of samples of materials having known compositions. Where M constituents influence the property in question, tests of $(M+1)$ or more samples having $(M+1)$ or more different compositions will provide sufficient data to derive $F_i$ for $i=1$ to M, i.e., for all of the constituents. Most preferably, the samples tested to derive the values for $F_i$ are samples having compositions and properties close to those of the materials used in the starting assemblage or plate arrays. This tends to minimize the errors in the various $F_i$ caused by variation in $F_i$ with composition. In a particularly preferred arrangement, the samples tested to determine $F_i$ are samples of the actual starting materials, i.e., the glass slabs which are available for manufacture of the plates as discussed above. Different values of the coefficients $F_i$ are derived for different regions of the assemblage. For example, the values of the coefficients $F_i$ for use in the region from $z=z_2$ to $z=z_3$ desirably are derived from tests of samples having compositions close to that of plate 14 and, most preferably are derived from tests of samples including a sample of the actual glass used to make plate 14 together with one or more of the actual glasses used to make the adjacent plates 12 and 16.

The same principles can be applied using other formulas for f(n). Numerous other formulas have been proposed for relating the compositions of glasses to their refractive indices. Among these is the important formula set forth in articles by M. L. Huggins, J. Opt. Soc. Am 30, 495 (1940) and 32, 635 (1942). The disclosure of these articles is hereby incorporated b reference herein. Although the different formulas for refractive index will provide slightly different results, such differences are less significant than might appear. Again, because the coefficients $F_i$ are used only to adjust for the difference in refractive index from the starting plate composition of a plate in the array and the final composition at a point within such plate after diffusion, errors in the coefficients $F_i$ will affect only the amount of the correction for deviation. To use a simple example, where the difference between the predicted refractive index and (z,t) and the starting refractive index of one of the plates $n_0$ amounts to $0.1n_0$ (a very substantial change due to the effect of diffusion) and where the coefficients introduce an error of 1 percent or 0.01 times this difference, such error will amount to only $0.001n_0$.

Other concentration to property relationships can be applied to predict properties other than refractive index. In each case, the concentration to property index uses a function f(n) and a set of coefficients $F_i$ in the general relationship $$f(n(z)) = f(n_0) + \sum_i (c^i(z) - c_0^i) F_i$$

Once again, these properties may include optical properties such as Abbe value, dispersion and the like, and may also include mechanical properties. A particularly useful mechanical property which can be predicted in this manner is coefficient of thermal expansion. Where n represents the coefficient of thermal expansion, $f(n)=n$, i.e., the coefficient of expansion can be predicted with good accuracy using the so-called "rule of mixtures". Stated another way, the coefficient of expansion itself, rather than any complex function of the coefficient, can be directly equated to the sum of an expression using coefficients of the various concentrations. Once the system has calculated the concentration distribution for a particular plate array and a particular diffusion time, the system proceeds to calculate the property distributions for that time, including computation of refractive index distribution (reference numeral 60 in the flow chart of FIG. 5) and coefficient of thermal expansion distribution (reference numeral 62 in the flow chart). The coefficient of thermal expansion distribution represents the values of coefficients of thermal expansion which the assemblage would have if diffusion were stopped at the particular time under consideration.

In the next stage 64 of the process, the computer examines the coefficient of thermal expansion distribution and determines the maximum coefficient of thermal expansion gradient, i.e., the maximum value of the slope of the plot of coefficient of thermal expansion versus position or z-value. The system then checks this maximum coefficient of thermal expansion value against a preselected maximum. The stresses induced in the assemblage upon heating or cooling of the assemblage at a relatively low rate are directly related to the magnitude of the coefficient of thermal expansion gradient, and are likewise directly related to the magnitude of the temperature change. The maximum coefficient of thermal expansion gradient is selected based upon a design maximum temperature change so that when the assemblage goes through the design maximum temperature change the stress is less than the maximum stress which the material of the assemblage can tolerate. The design maximum temperature change is either the maximum the temperature change to be encountered in service or maximum temperature change which would be encountered in the manufacturing process itself, as in cooling from diffusion temperature to room temperature. Typically, the temperature change which would be encountered in manufacturing is greater than any which would be encountered in service. The maximum coefficient of thermal expansion gradient is selected so that, with the design maximum temperature change, the maximum thermal stress induced in the material would be less than less than the working stress limit of the material. If the maximum coefficient of thermal expansion gradient for a particular plate array and a particular diffusion time exceeds the maximum allowable coefficient of thermal expansion gradient, this indicates that an assemblage made by subjecting that particular plate array to diffusion for the particular diffusion time, would not survive in service. The other results for such assemblage and time are ignored. The computer proceeds along branch 68 of the flow chart. Assuming that the diffusion time represented on this particular pass through loop 50 has not exceeded the maximum allowable diffusion time, the computer proceeds along branch 70 back to the beginning of the loop.

The computer increments the time, i.e., chooses a new diffusion time higher than the previous diffusion time. The concentration distribution is calculated for this new diffusion time in the same manner as discussed above, and once again the refractive index or other optical property distribution and the coefficient of thermal expansion distribution are calculated and the series of operations repeat 50, 60 and 62. Assuming that the calculations for a new time yield a maximum coefficient of thermal expansion ("CTE") gradient less than the preselected maximum CTE gradient, this indicates that the assemblage, if made from the particular plate array and subjected to diffusion for the newly selected diffusion time, would yield a lens blank which could survive cooling and thermal changes in service. In step 74, the computer next computes a value of the fit between the refractive index or optical property distribution for the lens blank resulting from this plate array and this diffusion time. The fit calculation may use any of the various criteria known in the art of mathematics for determining the goodness of fit between one curve and another curve. Most preferably however, the fit is computed as the sum of the squares of deviation between the predicted refractive index distribution and the desired index distribution. Thus, at each of several points or different values of z, the value of the predicted refractive index for this particular time, n(z,t) is subtracted from the value of the refractive index specified for the same point z in the desired index of refraction distribution, each such difference is squared and the sum of such squares provide an index of the fit. The lower the value of such a sum, the better the fit. Assuming that the fit provided by the newly calculated refractive index distribution is better than any previously stored value of fit for the same plate array, the computer proceeds along path 76 and, at stage 78, stores the newly computed index distribution (the values of n(z,t) for various values of z for the particular time t under consideration) and also stores the value of t and the identification of the particular plate array used. The computer also stores a value for the fit for this newly stored distribution time and plate array identification. At this point, the computer proceeds to decision node 80.

Assuming that the time used on the last pass is less than the maximum allowable diffusion time, the computer will again pass through branch 70 and repeat loop 50, including all of steps 58, 60, 62 and 64, using a new, incremented time. Assuming that the thermal expansion values for the new time provide an acceptable CTE gradient, the refractive index distribution for the newly incremented time is again compared with the desired index and the fit is computed at steps 74. If this fit is better than the last previously recorded fit, the new index distribution, new time and new fit are stored along with the plate array identification, replacing the last previously written index distribution time and fit, and the cycle again repeats. This process continues until the maximum time is encountered or, as indicated at decision node 75, until the fit achieved for the newly incremented time is not better than the fit achieved for the last previously tried time. In this event, the computer drops out of loop 50 for the particular plate array. That is, for the particular plate array, the predicted fit would reach its best fit at a particular time and would start to get worse with further diffusion time. There is accordingly no reason to continue the calculations for the same plate array once this point has been reached. Thus, once this point has been reached, or once the maximum diffusion time has been reached, the computer drops out of loop 50 as indicated in branch 82 and branch 84. The particular value of diffusion time stored for the plate array by this point represent the best diffusion time for the particular plate array used, whereas the particular index distribution represents the best achievable index distribution for that plate array and the value of fit stored for the particular plate array represents the best achievable fit value for that same plate array.

At this point, assuming that there are additional plate arrays in the set of possible plate arrays selected at step blank, the computer proceeds along branch 86 of the flow chart and selects the next plate array. The diffusion time is again re-initialized and the series of calculations using loop 50 is repeated again, with incrementing of the diffusion time for the new plate array. This series results in storage of an optimum or best achievable index distribution for the newly selected plate array, along with the diffusion time required to achieve that best achievable distribution and a value for the fit for such best achievable distribution. This process repeats again and again, resulting in storage of similar values for each of the possible plate arrays selected in step 46.

Once all of the starting spatial distributions or possible plate arrays have been used, and after a best achievable index distribution fit, and associated best diffusion time have been selected for all the possible plate arrays, the program passes via branch 88 to the further steps illustrated in FIG. 6. This stage of the process simply conducts a straightforward search of the stored fits to determine which fit is best. That is, each stored fit is retrieved in order (step 90) along with the associated plate array, identification, time and distribution assuming that the retrieved fit is better than a previously stored value of the best fit, the newly retrieved value is substituted as the new best fit, and the plate array and diffusion time used to derive that best fit are stored as the best or optimum plate array and best diffusion time respectively. Likewise, the index distribution associated with the newly selected best fit is stored as the best distribution. This continues until all of the stored fits have been examined. Once that has occurred, the computer outputs the best array, the best time and, desirably, the best index distribution. These represent the optimum array and time to be used in fabrication of the actual piece.

In the next stage of the process, these values are applied in actual fabrication. That is, an actual assemblage is made to provide starting spatial distribution corresponding to the spatial distribution selected as the best array. Thus, actual plates are made with the thickness and compositions used in the selected best plate array, stacked upon one another in the same order as in the best array and subjected to diffusion for the best diffusion time. The calculations discussed above utilize diffusion coefficients $D_i$, and these diffusion coefficients depend markedly on the diffusion temperature. The calculations discussed above thus implicitly assume a particular diffusion temperature which would provide the diffusion constants used in the calculations. The actual diffusion step should utilize the same diffusion temperature as implicitly assumed in the calculations. Stated another way, if the diffusion constants used in the calculations are accurate for a particular temperature, that temperature should be used in the step of subjecting the actual plate array or starting assemblage to diffusion. As an alternative, the diffusion temperature can be varied over a small range from that implicitly assumed in the calculations, provided that the selected best diffusion time is adjusted to take account of the change in diffusivity resulting from the change in temperature. Changes in the optimum plate array typically would be small.

As would be readily appreciated by those skilled in the art, the diffusion process should be conducted under carefully controlled conditions using careful technique to avoid disturbing the assemblage during the diffusion process and to avoid inducing bulk flow currents in the assemblage. The techniques used for conducting the diffusion process using stacked plates are disclosed in the aforementioned U.S. Pat. No. 4,929,065 and need not be described further herein. The disclosure of said patent is hereby incorporated by reference herein. The diffusion process results in a fused, unitary body or lens blank having substantially the desired spatial distribution or Z direction gradient of index of refraction. Once the calculations have been performed, and assuming that the available starting materials remain constant, the calculation results remain valid and need not be recalculated for subsequent diffusion runs. Thus, the same actual plate array can be duplicated and subjected to diffusion over and over again under the same conditions.

However, if the available starting materials change, as where glass batches change, or where any other change makes it impractical to continue using exactly the same plate array, the calculation should be repeated using a new set of conditions, such as a new set of available starting materials to provide a new set of possible plate arrays.

Figure 7:
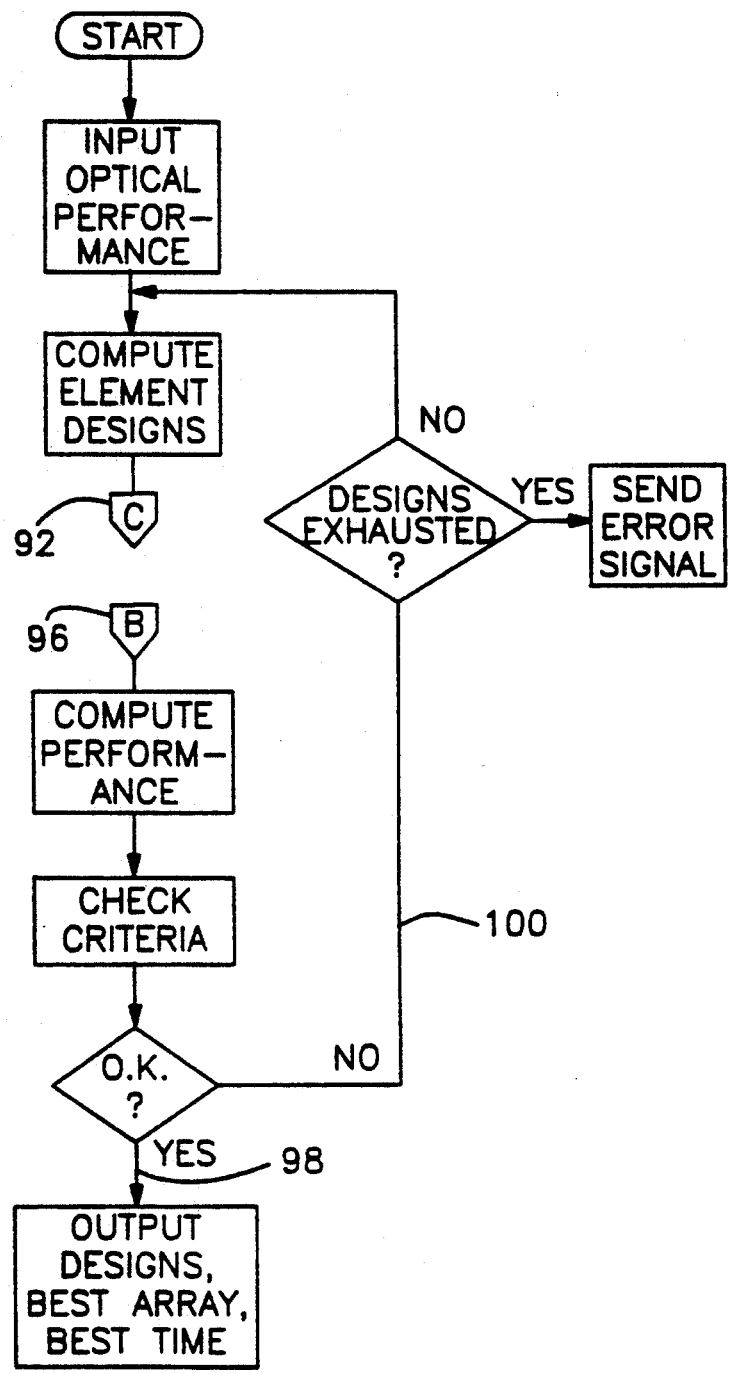

The calculations discussed above can be used within a larger calculation for design of an optical system. Thus, as shown in FIG. 7, an optical design routine starts with a desired set of optical performance characteristics along with other parameters such as maximum sizes of elements, overall space constraints and the like. Known optical design programs and algorithms can be used to compute a system design which includes designs for various optical elements, including a gradient index or other gradient property element. As will be appreciated by those skilled in the optics art, optical design software and algorithms are highly complex, but the same are well-known and hence need not be described herein. Such optical design algorithms, if instructed by the user to consider the possibility of a graded index element, can produce designs for all of the elements in the system including the desired spatial distribution of index of refraction or of any other optical property. According to a preferred aspect of the present invention, an otherwise conventional optical design algorithm (FIG. 7) desirably is arranged to branch from the element design (C-connector 92) back to the start of the diffusion predictive algorithm (FIGS. 5 and 6) and to return from the diffusion predictive algorithm after the point where the diffusion predictive algorithm has selected the optimum plate array and diffusion time, and after the diffusion predictive algorithm has predicted the best possible distribution achievable with the available starting materials to match the design selected by the optical design algorithm. Thus, from connector 96 (FIG. 6) at the end of the diffusion predictive algorithm, the system returns back to the optical design software. At this point, the optical design software can calculate whether or not the best achievable distribution returned via from diffusion predictive algorithm will be satisfactory in the system as designed. Thus, the optical design software can use the predicted distribution of index of refraction (or any other optical property) as a parameter in computation of system performance, and can check the system performance against preselected performance criteria. Here again, well-known optical design and performance checking criteria can be employed. Assuming that the performance meets the criteria, the system can pass through logic path 98, indicating that the job is done. That is, the system has found that a gradient property element with the required spatial distribution of index of refraction or other optical property can in fact be made and has obtained the starting plate array and diffusion time from the diffusion algorithm. However, if the particular design selected on the first pass through the diffusion algorithm results in a best achievable property distribution that gives unsatisfactory performance, the system passes along branch 100. This indicates that the gradient property element design selected on the first pass cannot be satisfactorily made using the available materials. Assuming that the system has not exhausted all possible designs, the optical design software changes one or more parameters of one of the other elements, yielding a corresponding change in the design for the gradient property optical element, and the process repeats. This continues until a satisfactory design is achieved or until all possible designs within the capability of the optical design software have been exhausted, whereupon the system sends an error signal. As will be appreciated, this allows the optical designer to determine, before actually building a system, whether or not it is possible to achieve a given level of performance using a gradient property element. The diffusion predictive steps of FIGS. 5 and 6 thus can be integrated into the overall system design.

As will be readily appreciated, numerous variations and combinations of the features described above can be utilized without departing from the present invention. The particular computations discussed above with reference to FIGS. 5 and 6 use only a single, preselected diffusion temperature, so that each diffusion time-temperature profile specifies a single time at such preselected temperature. However, each profile may include a plurality of segments at a plurality of temperatures. In that case, diffusion constants $D_i$ for the various temperatures would be loaded into the computer. The steps of setting and incrementing the time (FIG. 5) would be replaced by plural, separate steps of setting and incrementing the times at the various temperatures. In the step of computing the concentration distribution, the integration would be conducted over each time segment using the diffusion constants for the particular temperature used in that time segment. In an extension of this approach, one or more of the segments could include a continuous temperature change according to a preselected function of time, and the integration over each such segment could include computation of the values of diffusion constants for each short increment of such segment. In a further variant, the diffusion time or the time for each segment of the process can be assumed fixed, and the temperature can be varied in the same way as time is varied in the processes discussed above.

The particular system discussed above utilizes a desired distribution of index of refraction. Manifestly, any other optical property can be used in exactly the same way. Also, the system discussed above utilizes starting spatial distributions which represent arrays of plates of differing compositions, i.e., starting spatial distributions for which the concentrations of the various constituents vary in only one dimension, (the Z-direction). However, in some starting assemblages, such as the glass-frit assemblages disclosed in U.S. Pat. Nos. 4,883,522 and 4,907,864, the concentrations of various constituents may vary in multiple dimensions. Substantially the same techniques as discussed above can be utilized, provided that the step of deriving the concentration to time relationship (the step of deriving the concentration distribution for each diffusion time) is adjusted to provide a proper prediction of the multidimensional diffusion. Typically, such multidimensional diffusion can best be predicted by finite element, methods, by relaxation methods, or by extensions of the Green's function method described earlier. Also, it is possible to merge the steps of computing a concentration distribution and converting that concentration distribution to a property distribution. As these and other variations and combinations of the features discussed above can be utilized without departing from the present invention, the foregoing description of the preferred embodiment should be taken by way of illustrating rather than by way of limitation of the invention as defined by the claims.

What is claimed is:

1. A method of making a refractive element having a preselected spatial distribution of at least one property comprising the steps of:

(a) for each of a plurality of different starting spatial distributions of concentration of one or more constituents, calculating a predicted concentration-to-profile relationship incorporating a predicted spatial distribution of concentrations of said constituents for each of several diffusion time-temperature profiles;

(b) converting each said predicted spatial distribution of concentration into a predicted spatial distribution of said at least one property by applying a concentration-to-property relationship relating concentration of said one or more constituents and said at least one property to thereby provide one said predicted spatial distribution of said at least one property for each said starting spatial distribution of concentration and each diffusion time-temperature profile;

(c) selecting the predicted spatial distribution of said at least one property which most closely approximates said preselected spatial distribution, whereby the starting spatial distribution of concentration and diffusion time-temperature profile associated with such predicted spatial distribution of said at least one property are selected as optimum;

(d) providing an assemblage of starting materials corresponding to said optimum starting spatial distribution of concentration; and (e) subjecting said assemblage to diffusion under time and temperature conditions replicating said optimum diffusion time-temperature profile.

2. A method as claimed in claim 1 wherein said several time-temperature profiles include different diffusion times at a preselected diffusion temperature.

3. A method as claimed in claim 2 wherein said time-temperature profiles consist only of different diffusion times at said preselected diffusion temperature.

4. A method as claimed in claim 1 wherein said starting spatial distributions of concentration incorporate variations in concentration of said at least one constituent in only one dimension.

5. A method as claimed in claim 4 wherein said starting distributions of concentration correspond to the distributions of concentration achieved by stacking flat plates each having uniform densities of said constituents.

6. A method as claimed in claim 1 wherein said concentration-to-property relationship includes a set of one or more coefficient associated with said constituents.

7. A method as claimed in claim 6 further comprising the step of determining said coefficients by measuring each said property for a plurality of test samples having known densities of said constituents.

8. A method as claimed in claim 7 wherein each starting spatial distribution corresponds to the distribution of concentration achieved by juxtaposing a plurality of masses each having uniform composition and selected from a set of starting materials, said test samples also having compositions selected from said set of starting materials.

9. A method as claimed in claim 6 wherein said concentration-to-property relationship includes a relationship between a function of at least one said property and a sum of one or more concentration terms, each said concentration term being the product of one said coefficient and a first order function of the concentration of one said constituent.

10. A method as claimed in claim 9 wherein each said first order function is a difference between the concentration of one said constituent and the concentration of such constituent in a preselected base composition.

11. A method as claimed in claim 6 wherein said concentration-to-property relationship includes a relationship between a function of at least one said property and an expression including a cross-sensitivity term, each said cross-sensitivity term including a function of the densities of a plurality of said constituents.

12. A method as claimed in claim 9 wherein each said cross-sensitivity term includes a product of the densities of two said constituents.

13. A method as claimed in claim 1 wherein said at least one property includes refractive index and said concentration-to-property relationship includes a relationship between a function of refractive index and a function of the densities of said constituents.

14. A method as claimed in claim 11 wherein said relationship between said function of refractive index and said function of densities is:

$$\frac{3(n^2 - 1)}{(n^2 + 2)} = \sum_i c^i(z) P_i$$

wherein:
Z is location;
n is the index of refraction at location z;
$c^i(z)$ is the concentration of the $i^{th}$ one of said constituents, expressed as a function of Z; and
$P_i$ is electrical polarizability of the $i^{th}$ constituent.

15. A method as claimed in claim 1 wherein said starting distributions of concentration incorporate variations in concentration of said at least one constituent in only one dimension and wherein said step of calculating said concentration-to-profile relationships includes the step of deriving solutions to differential equations of the form:

$$\frac{d}{dz}\left[D_i(z)\frac{d}{dz}c^i(z,t)\right] = \frac{d}{dt}c^i(z,t)$$

in which
Z is distance along the Z-axis;
t is time;
$c^i$ is the concentration of the $i^{th}$ constituent; and $D_i$ is the diffusion coefficient for the $i^{th}$ constituent at a diffusion temperature expressed as $D_i(Z)$ to denote that the diffusion coefficient itself may be a function of Z.

16. A method as claimed in claim 1 wherein each starting spatial distribution corresponds to the distribution of concentration achieved by juxtaposing a plurality of masses of starting materials each having a uniform composition selected from a set of starting compositions, said step of providing an assemblage including the step of juxtaposing starting masses of said starting materials.

17. A method as claimed in claim 16 further comprising the steps of monitoring the actual compositions of said starting materials and performing said steps (a) through (c) using the actual compositions as said set of starting compositions to provide said selected, optimum starting spatial distribution of concentration and optimum diffusion profile based upon the actual compositions.

18. A method as claimed in claim 17 further comprising the steps of repeating the aforesaid steps (d) and (e) a plurality of times using different actual compositions on at least some repetitions and repeating steps (a) through (c) for said different actual compositions so that the selected, optimum starting spatial distribution of concentration and diffusion profile used on each repetition of steps (d) and (e) are based upon the actual compositions used in that repetition.

19. A method as claimed in claim 18 wherein said starting materials are glasses and different batches of said glasses are used on at least some of said repetitions of steps (d) and (e).

20. A method as claimed in claim 19 wherein said at least one property includes index of refraction and said step of monitoring said actual compositions includes the step of measuring the index of refraction of said glasses.

21. A method of making a refractive element comprising the steps of:
   (a) determining a desired spatial distribution of at least one optical property to yield a desired optical performance;
   (b) selecting a set of available starting spatial distributions of concentration of at least one constituent, and, for each starting spatial distribution in said set, calculating a predicted concentration-to-profile relationship relating spatial distribution of concentration of said at least one constituent to diffusion time-temperature profile and including a predicted spatial distribution of concentrations for each of several diffusion time-temperature profiles;
   (c) converting each said predicted spatial distribution of concentration into a predicted spatial distribution of said at least one optical property to diffusion time-temperature profile by applying a concentration-to-property relationship relating concentration of said at least one constituent and said at least one optical property to thereby provide one said predicted spatial property distribution for each said starting spatial distribution of concentration and each diffusion time-temperature profile;
   (d) selecting from said predicted spatial distributions of said at least one optical property a best achievable property distribution which most closely approximates said desired spatial distribution to thereby select an optimum diffusion time-temperature profiles and optimum starting spatial distribution of concentration;
   (e) determining whether the best-achievable spatial distribution of said at least one optical property matches said desired spatial distribution to within a preselected standard of acceptability and, if not, repeating the aforesaid steps using a different desired spatial distribution on each such repetition until such a match is found; and, after said match is found,
   (f) providing an assemblage of starting constituents corresponding to the starting spatial distribution of concentration which provides such match; and
   (g) subjecting said assemblage to diffusion for under time and temperature conditions replicating said optimum diffusion time-temperature profile for said selected starting spatial distribution of concentration.

22. A method as claimed in claim 21 wherein said determining step includes the step of calculating the optical performance which would be achieved by hypothetical refractive elements having said best-achievable spatial distribution of said at least one optical property and determining whether such calculated optical performance corresponds to said desired optical performance to within a preselected tolerance.

23. A method as claimed in claim 21 further comprising the step of calculating the mechanical performance which would by achieved by hypothetical refractive elements having said best-achievable spatial distributions of said at least one optical property and excluding from said match-determining step any such best-achievable spatial distribution for which said calculated mechanical performance is unacceptable.

24. A method as claimed in claim 23 wherein said step of calculating the mechanical performance includes the step of calculating a spatial distribution of at least one mechanical property from a spatial distribution of said at least one constituent associated with each said best-achievable spatial distribution of said at least one optical property.

25. A method as claimed in claim 24 wherein said at least one mechanical property includes a coefficient of thermal expansion.

* * * * *